(12) United States Patent
Jiang et al.

(10) Patent No.: US 8,489,581 B2
(45) Date of Patent: Jul. 16, 2013

(54) METHOD AND APPARATUS FOR SELF OPTIMIZING DATA SELECTION

(75) Inventors: Shun Jiang, Beijing (CN); Kenneth M. Johns, Tampa, FL (US); James J. Rhodes, San Jose, CA (US); Hovey Raymond Strong, Jr., San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 135 days.

(21) Appl. No.: 12/845,254

(22) Filed: Jul. 28, 2010

(65) Prior Publication Data

US 2012/0030218 A1 Feb. 2, 2012

(51) Int. Cl.
G06F 17/30 (2006.01)

(52) U.S. Cl.
USPC .......................................... 707/719; 707/754

(58) Field of Classification Search
USPC .............. 707/637, 660, 686, 706, 713–722, 707/748–754, 999.001–999.01, 999.1, 999.101–999.107, 999.2–999.206
See application file for complete search history.

(56) References Cited

U.S. PATENT DOCUMENTS

| 5,634,049 | A | 5/1997 | Pitkin | |
|---|---|---|---|---|
| 5,761,654 | A | 6/1998 | Tow | |
| 6,026,418 | A | 2/2000 | Duncan, Jr. | |
| 6,360,021 | B1 | 3/2002 | McCarthy et al. | |
| 7,046,857 | B2 | 5/2006 | McCarthy | |
| 2001/0056362 | A1* | 12/2001 | Hanagan et al. | 705/7 |
| 2002/0114270 | A1* | 8/2002 | Pierzga et al. | 370/208 |
| 2003/0051165 | A1* | 3/2003 | Krishnan et al. | 713/201 |
| 2004/0243576 | A1* | 12/2004 | Shrivastava et al. | 707/5 |
| 2005/0143634 | A1* | 6/2005 | Baker et al. | 600/310 |
| 2009/0043729 | A1 | 2/2009 | Liu et al. | |
| 2009/0098828 | A1* | 4/2009 | Furman et al. | 455/63.1 |
| 2011/0173342 | A1* | 7/2011 | Cooper et al. | 709/233 |
| 2012/0169542 | A1* | 7/2012 | Mathews et al. | 342/450 |

OTHER PUBLICATIONS

Liu et al., A Generic Flow Algorithm for Shared Filter Ordering Problems, Proceedings of the twenty-seventh ACM SIGMOD-SIGACT-SIGART Symposium on Principles of Database Systems, 2008, pp. 79-88.

Liu et al., Near-Optimal Algorithms for Shared Filter Evaluation in Data Stream Systems, Proceedings of the 2008 ACM SIGMOD International Conference on Management of Data, 2008, pp. 133-146.

Deshpande et al., Adaptive Query Processing, Foundations and Trends in Databases, vol. 1, No. 1, 2007, pp. 1-140.

(Continued)

*Primary Examiner* — Hosain Alam
*Assistant Examiner* — Reza Hosseini
(74) *Attorney, Agent, or Firm* — Lieberman & Brandsdorfer, LLC

(57) ABSTRACT

A method, system, and article for improving performance of a Boolean combination of at least two filters to a data stream. Stream processing is applied to an expression having two or more logical operators. As the data stream is processed, efficiency of the operators in the expression is evaluated. A sort algorithm is dynamically invoked to ensure that a more efficient operator precedes processing of a less efficient operator.

17 Claims, 5 Drawing Sheets

OTHER PUBLICATIONS

Munagala et al., Optimization of Continuous Queries with Shared Expensive Filters, Proceeding of the twenty-sixth ACM SIGMOD-SIGACT-SIGART Symposium on Principles of Database Systems, 2007, pp. 215-224.

Condon et al., Flow Algorithms for Two Pipelined Filter Ordering Problems, Proceedings of the twent-fifth ACM SIGMOD-SIGACT-SIGART Symposium on Principles of Database Systems, 2006, pp. 193-202.

Duffield et al., Optimal Combination of Sampled Network Measurements, USENIX Association, Internet Measurement Conference, 2005, pp. 91-104.

Hellerstein et al., Predicate Migration: Optimizing Queries with Expensive Predicates, 1992.

\* cited by examiner

METHOD AND APPARATUS FOR SELF OPTIMIZING DATA SELECTION

BACKGROUND

1. Field of the Invention

This invention relates to complex data stream processing in a computer system environment. More specifically, the invention relates to application of logical operators and organization of the operators in an order to optimize performance of data processing.

2. Background of the Invention

In a data streaming environment, massive amounts of data are constantly written to the storage subsystem. Data is growing at an incredible rate with the majority being unstructured information. This data may contain complex information, such as chemical, gene, protein, bio, nano diagrams, sketches or images, all which may be contained in data streams. It is difficult for a computer system to efficiently and accurately extract and analyze structures from data streams using existing implemented techniques. It is also challenging to maintain required software using conventional techniques.

Distributed computer systems designed to handle large-scale data stream processing are evolving. For example, known techniques for handling data stream processing are only successful if the data is uniform and well formatted. However, real data is 'noisy' and requires extra effort to remove the noise. In one embodiment, noise refers to irrelevant or meaningless data. A noisy data stream presents a significant challenge when the data must be cleansed, corrected for errors, or corrected by interpolation for missing data. One manner of processing data employs one or more logical operators in the form of Boolean combinations of simple filters for data stream processing. The logical operator(s) process data chunks from an input stream and either pass them on to an output data stream or reject them by passing either nothing or an indicator of rejection to the output stream.

Boolean combination filtering can be used in various data intensive applications. There are two ways to compute a filter with Boolean combinations, including processing multiple components of the filter concurrently, and processing multiple components of the filter consecutively. In order to optimize the performance of a filter that is a combination of other filters, the programmer typically must guess the time that will be required to compute each component of the Boolean filters and the likelihood of each component filter passing a given chunk of data. Accordingly, there is a need to mitigate or eliminate the human guesswork associated with the process by which application order of component filters is determined.

BRIEF SUMMARY

This invention comprises a method, system, and article for evaluating order of filter processing, and for dynamically changing the processing order to improve processing efficiency.

In one aspect of the invention, a method is provided for improving performance of a Boolean combination of two or more filters to a data stream. A first object is maintained for a first filter. The first object determines an accumulated processing time by the first filter to process a chunk of data from the data stream. A second object is maintained for a second filter. The second object determines an accumulated processing time by the second filter to process a chunk of data from the data stream. Based upon values gathered by the first and second objects, an order of application of the filters to read chunks of data is selected. In addition, two or more estimators are maintained. Each set is employed to estimate performance of the filter given a specified performance of at least one of the search filters. The order of application of the first and second filters is dynamically sorted based upon the maintained estimators. More specifically, the dynamic sort of the filters enables a more efficient filter to process before a less efficient filter.

In another aspect of the invention, a computer system is provided to evaluate efficiency of filter processing for data chunks from an input data stream. The system includes a processor in communication with memory. As an input data stream is processed, a first object is maintained by a first filter and a second object is maintained by a second filter. The first object determines an accumulated processing time by the first filter to process a chunk of data from the input data stream. Similarly, the second object determines an accumulated processing time by the second filter to process a chunk of data from the input stream. An order manager is provided to select an order of the filters to the data stream being processed. In addition, both a filter manager and a sort manager are provided in communication with the order manager. The filter manager maintains at least two sets of estimators for the first filter. Each of the estimators evaluates performance of the first filter given a specified performance for the filters. The sort manager dynamically sorts the selected order of application of the filters so that based upon the maintained estimators a more efficient filter precede a less efficient filter.

In yet another aspect of the invention, an article is provided for evaluating order processing of filters for an input data stream. A computer readable carrier is provided with computer program instructions configured to improve performance of a Boolean combination of two or more filters applied to the input data stream. The instructions include instructions to maintain first and second objects to respectively determine an accumulated time to process a chunk of data from the input data stream. Instructions are also provided to select an order for application of the first and second filters based upon values of the first and second objects. In addition, instructions are provided to maintain two or more sets of estimators for the first filter, with each set to estimate performance of the first filter given a specified performance of at least one of the search filters. Based upon the sets of estimators that are maintained, an order of application of the filters is dynamically sorted so that a more efficient filter precedes a less efficient filter for data stream processing.

Other features and advantages of this invention will become apparent from the following detailed description of the presently preferred embodiment of the invention, taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments of the invention, and not of all embodiments of the invention unless otherwise explicitly indicated. Implications to the contrary are otherwise not to be made.

DETAILED DESCRIPTION

Figure 1:
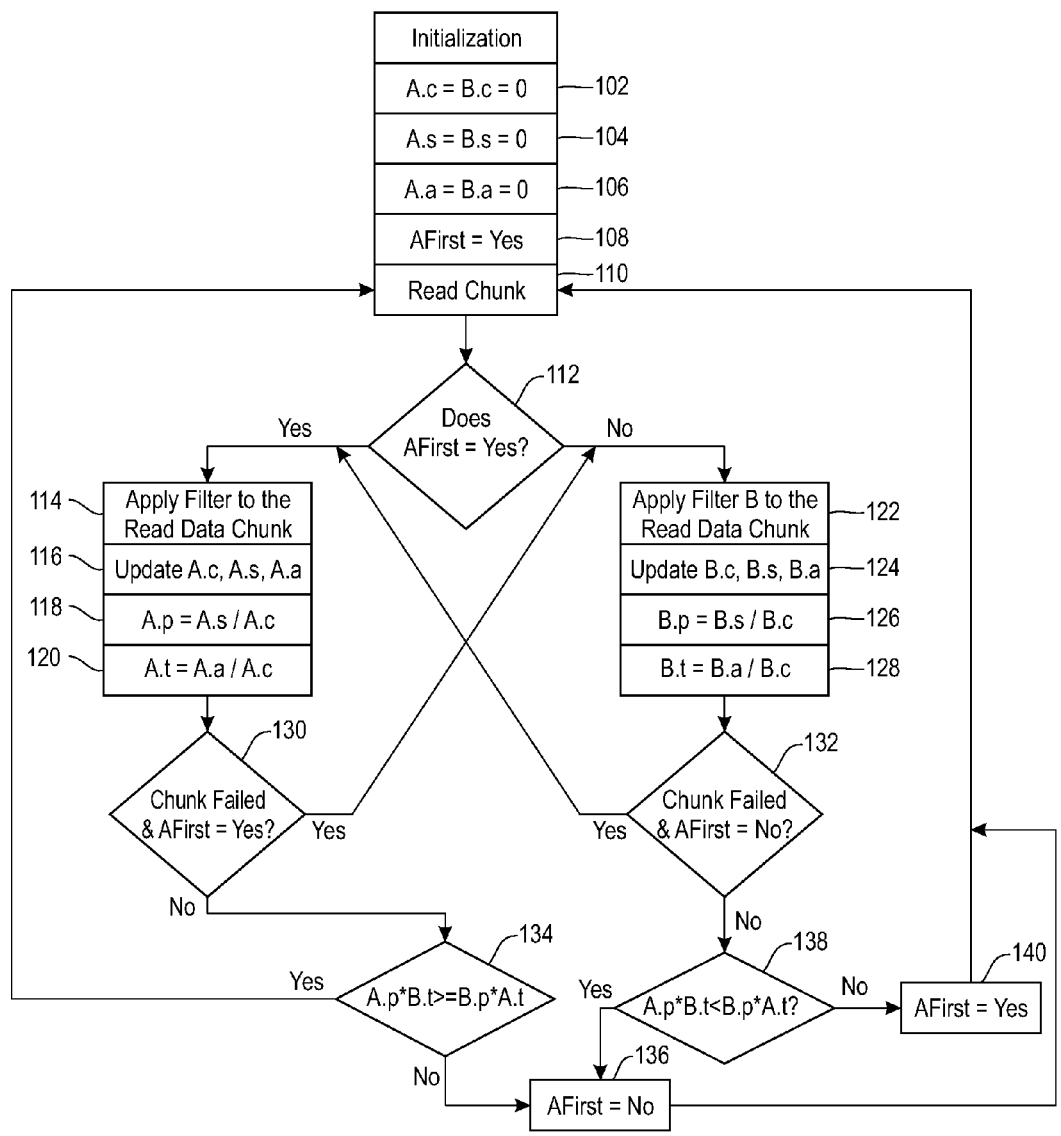
FIG. 1 is a flow chart illustrating a process for computing a filter evaluation for two filters with a logical OR operator applied to the filters.

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

The functional units described in this specification have been labeled as managers and directors. A manager and/or director may be implemented in programmable hardware devices such as field programmable gate arrays, programmable array logic, programmable logic devices, or the like. The manager and/or director may also be implemented in software for processing by various types of processors. An identified manager and/or director of executable code may, for instance, comprise one or more physical or logical blocks of computer instructions which may, for instance, be organized as an object, procedure, function, or other construct. Nevertheless, the executables of an identified manager and/or director need not be physically located together, but may comprise disparate instructions stored in different locations which, when joined logically together, comprise the manager and/or director and achieve the stated purpose of the manager and/or director.

Indeed, a manager and/or director of executable code could be a single instruction, or many instructions, and may even be distributed over several different code segments, among different applications, and across several memory devices. Similarly, operational data may be identified and illustrated herein within the manager and/or director, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, such as examples of a data stream manager, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

There is a special class of operators that occur frequently in data stream processing. Operators in this class are referred to as filters. A filter processes chunks of data from an input data stream, and the filter either passes the processed data chunk on to an output data stream or rejects the input by either passing nothing or an indicator of rejection to the output data stream. In one embodiment, a data chunk is a segment of data that is read from a data input stream. Similarly, in one embodiment, the filter(s) that process the chunks of data are a single filter or a Boolean combination of filters. In order to adjust the order of application of the filters to a chunk of data over time, statistical data pertaining to chunk processing is maintained and evaluated.

A filter performance accumulator (FPA) is an object that maintains three numerical quantities associated with execution of a filter. The three numerical quantities include:
 the number of data chunks processed, c,
 the number of data chunks that passed the filter, s, and
 the accumulated processing time used by the filter to process the data chunks, a.

Based upon the maintained quantities, two quantities associated with an FPA that have processed at least one data chunk can be derived. They include:
 a success rate, p, defined as s/c, and
 an average processing time, t, defined as a/c.

FIG. 1 is a flow chart (100) illustrating a process for computing a filter evaluation for the combination of two filters combined with a logical OR combinator. In one embodiment, the combination filter may employ a different logical combinator, such as logical AND, and as such, the invention should not be limited to application of the logical OR operator. The variable A.c. represents the number of data chunks processed by filter A, and the variable B.c. represents the number of data chunks processed by filter B. Initially, variables A.c. and B.c. are each initialized (102). In addition, the variable representing the number of data chunks that passed filter A, A.s., and the variable representing the number of data chunks that passed filter B, B.s., are each initialized (104), as are the variables representing the accumulated processing time used by filter A to process data chunk(s), A.a., and the variable representing the accumulated processing time used by filter B to process data chunk(s), B.a. (106). The final initialization pertains to the processing of one filter, filter A, prior to the processing of a second filter, filter B. The example employed herein utilizes two filters, A and B, one of the filters processes before the other filter. The processing of filter A prior to filter B is initialized as Yes (108). Accordingly, prior to processing any data chunks and determining an order for application of one or more logical operator, all of the variable factors are initialized.

Following completion of the initializations, a data chunk is read from the data stream (110). Prior to processing the read data chunk, it is determined if the processing of filter A is determined to precede processing of filter B (112). In one embodiment, the determination is based upon the initialization at step (108). A positive response to the determination at step (112) is followed by applying filter A to the read data chunk (114), and updating the values of A.c, A.s, and A.a (116). Based upon these updated values, the success rate A.p is calculated as the quotient of A.s and A.c (118). The average processing time A.t is calculated as the quotient of A.a and A.c (120). When filter A is processed prior to filter B, the quantity A.p acts as an estimator for the probability that filter A passes an input and the quantity A.t acts as an estimator for the expected time for filter A to test an input. If at step (112) it is determined that the processing of filter B precedes the processing of filter A, filter B is applied to the read data chunk (122), and the values of B.c, B.s, and B.a are updated (124). Based upon these updated values, the success rate B.p is calculated as the quotient of B.s and B.c (126). The average processing time B.t is calculated as the quotient of B.a and B.c (128). When filter A is processed prior to filter B, the quantity B.p acts as an estimator for the probability that filter B passes an input given that filter A has not passed that input, and the quantity B.t acts as an estimator for the expected time for filter B to test an input given that filter A has not passed that input. Following the completion of processing of filter A at step (120), it is determined if the read and processed data chunk was rejected by filter A (130). If there was a rejection, filter B processes the data chunk, as demonstrated in steps (122)-(128). Conversely, if filter B processes the read data chunk prior to filter A, following step (128) it is determined if the read and processed data chunk was rejected by filter B (132). If there was a rejection of the data chunk by filter B, filter A processes the data chunk, as demonstrated in steps (114)-(120). Accordingly, if either one of the filters, filter A or filter B, precedes the other and rejects the read data chunk, the other filter proceeds with processing.

Following a negative response to the determination at (130), it is determined if the value of A.p*B.t>=B.p*A.t (134). A positive response to the determination at step (134) maintains the order of filter processing with a return to step (110) to read and process the next data chunk. However, a negative response to the determination at step (134) is followed by changing the AFirst flag to No (136), followed by a return to step (110) to read and process the next data chunk. On a similar basis, following a negative response to the determination at step (132), it is determined if the value of A.p*B.t<B.p*A.t (138). A positive response to the determination at step (138) maintains the order of filter processing (136) followed by a return to step (110) to read and process the next data chunk. However, a negative response to the determination at step (136) is following by changing the AFirst flag to Yes (140), followed by a return to step (110) to read and process the next data chunk. As demonstrated in the example above, the read data chunk is processed through filter A prior to filter B while A.p*B.t>=B.p*A.t. If this mathematical relationship changes, then the read data chunk is processed through filter B prior to filter A. Accordingly, a test is implemented to change the order of processing of filters based upon a comparison of the product of the success rate of one filter with the average processing time of a second filter following processing of each data chunk.

The process illustrated in FIG. 1 functions when the probability of filter A passing a data chunk and the expected time for filter A to process a data chunk are independent of the like quantities for filter B. If these probabilities and expected times cannot be assumed independent, then there may be a systemic bias. To address the possible systemic bias, and possible correction thereof, a new FPA is employed. More specifically, two arrays are defined, one for normal operation and one for special operation for systemic bias detection and management.

Figure 2:
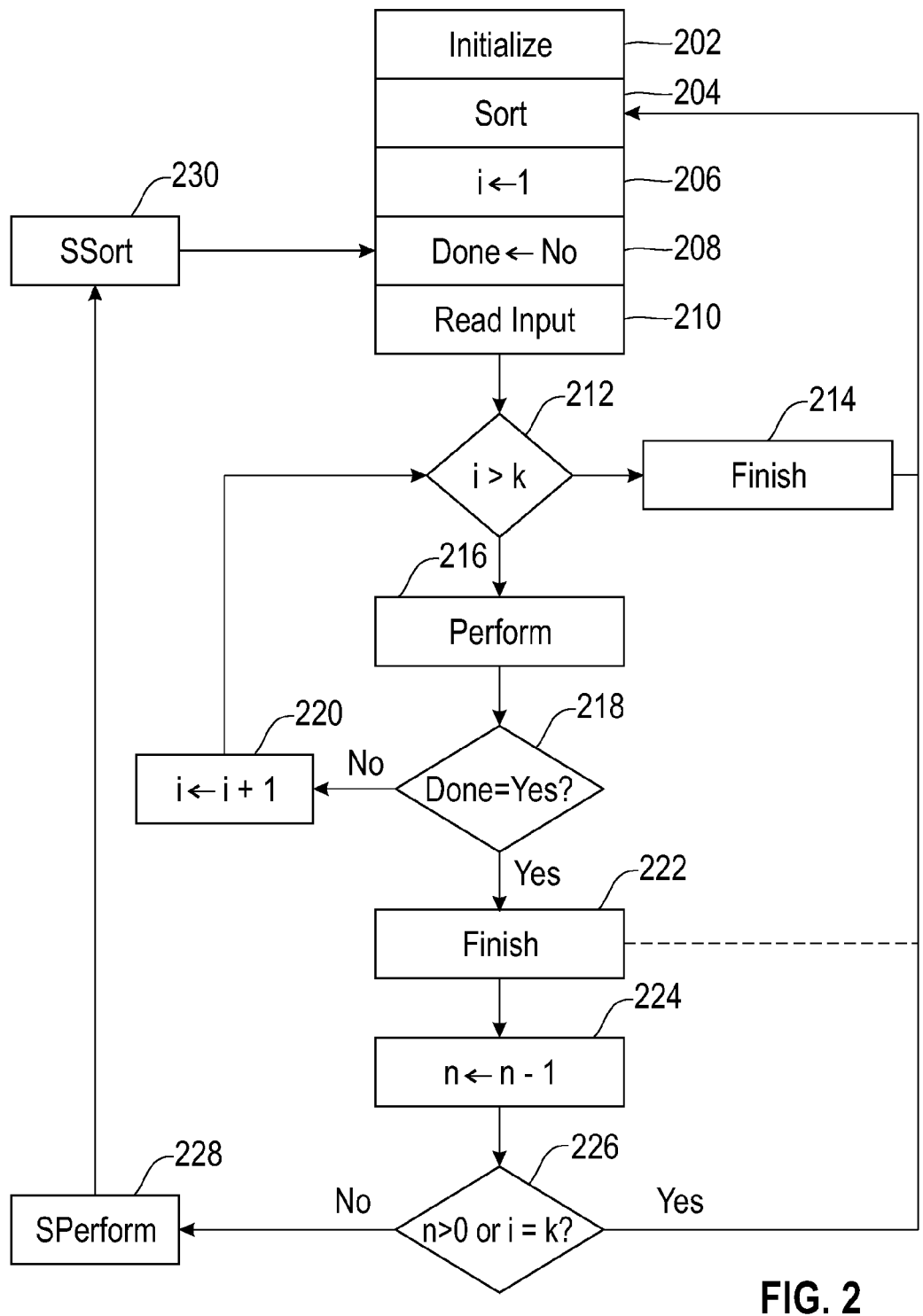
FIG. 2 is a flow chart flow chart illustrating a high level application of addressing and correcting for a detected systemic bias in application of filters to a data chunk.

FIG. 2 is a flow chart (200) illustrating a high level process for evaluating a combination of filters (k in number) combined with the Boolean combinator b (which is either logical OR or logical AND). It extends the process described in FIG. 1, detecting and correcting (the order in which the filters are applied) for a detected systemic bias in the statistics used to determine the order of application of filters to a data chunk. The first process (202) applies to initialization of the filters to be applied to the data chunk(s) and to the Boolean operator. More specifically, each of the following elements are initialized to remove any prior statistical information: for each filter, the number of data chunks processed, the number of data chunks that passed the filter, the accumulated process time, success rate, average processing time, etc., and a counting variable n is set to some number within some specified bounds. In one embodiment of our invention, the number n is chosen at random. The random number is used to control the execution of extra work that is done to detect and correct for possible systematic bias in the statistics. Choosing the number n at random mitigates the possibility of periodic statistical bias. Following completion of the initialization, a sorting algorithm is applied to the filters (204). More specifically, the order of the filters may be changed if it is determined that the most efficient filter is processed later than a preceding filter. In one embodiment, the sorting algorithm is a bubble sort. However, the invention should not be limited to a bubble sort algorithm, as other sorting algorithms may be employed to modify the order of processing of filters. Once the sorting algorithm is completed, an index variable, i, is initialized to the integer one indicating the first filter in the current order (206), a completion flag is set to "no" (208), and a data chunk is read from a data input stream (210). It is then determined if the index variable, i, is greater than the quantity of filters (212). A positive response to the determination at step (212) is followed by invoking an algorithm to finish processing without invoking further filters (214). In one embodiment, the following pseudo code may be employed for the finishing process:

If ((b=OR) and (done=Yes)) then pass the data chunk (the data chunk successfully passed the test consisting of the combination of the n filters using the Boolean combinator b);

If ((b=AND) and (done=No)) then pass the data chunk (the data chunk successfully passed the test consisting of the combination of the n filters using the Boolean combinator b);

Otherwise, reject the data chunk (the data chunk failed the test consisting of the combination of the n filters using the Boolean combinator b).

Following the completion of the step (214), the procedure returns to step (204) for the sorting algorithm.

If at step (212) it is determined that the index variable, i, is less than or equal to the quantity of filters evaluating the read data chunk, an algorithm is invoked to maintain statistics pertaining to efficiency of the filters and their processing of data chunks (216). In one embodiment, the following pseudo code is employed pertaining to obtaining the statistical data at step (216):

Reset timer
Start timer
result ← apply (f[i], input) /Apply filter i to input data chunk and get result/
Stop timer /track time to process data chunk/
if (b=OR) then if (result=Pass) then done ← Yes
if (b=AND) then if (result = Fail) then done ← Yes
c[i] ← c[i] + 1 /increase count/

```
if (done=Yes) then s[i] ← s[i] + 1 / array of chunks passed incremented]
a[i] ← a[i] + time /accumulate time/
Return
```

Following the gathering of the statistics at step (216), it is determined if the done flag is set to "yes" (218). A negative response to the determination at step (218) is following by an increment of the index variable, i, (220), followed by a return to step (212). Conversely, a positive response to the determination at step (218) is followed by completion of the filter evaluation and correction protocol (222) as represented and described at step (214).

In order to address system bias in filter processing and evaluation, following completion of the protocol represented at step (216), the counter, n, is decremented by one. (224). Following the assignment at step (224), it is determined if the random counter variable, n, is a positive number together with the relationship of the counting variable, i, with respect to the number of filters invoked to process the read data chunks (226). If it is determined that the random counter variable n is a positive number or that the index variable i is equal to the number of filters, then the process returns to step (204) for sorting of the logical filters in the expression. Conversely, if it is determined at step (226) that the random counter variable is equal to zero and the counting variable, i, is less than the number of filters, a series of actions (228) are invoked to adjust statistics that have been gathered and to apply the adjusted statistics to extra work to be performed to address systemic bias. More specifically, the actions at step (228) adjust statistical data associated with system bias.

Figure 3:
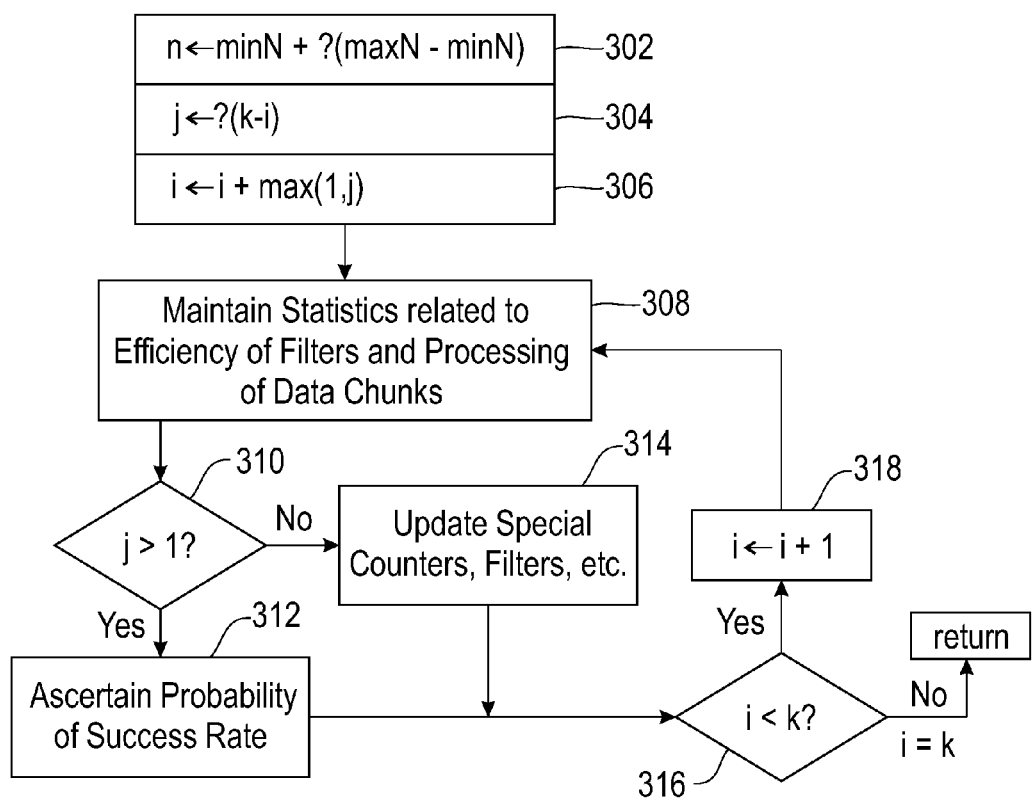
FIG. 3 is a flow chart illustrating actions and determinations to be conducted to maintain statistical data pertaining to detecting any systemic bias in the data.

FIG. 3 is a flow chart (300) illustrating the actions and determinations to be conducted to maintain statistical data pertaining to detecting any systemic bias in the data. Initially, the critical variables are initialized. The initializations include resetting the random counter variable, n, to be a random number for the next test time (302), employing an auxiliary variable, j, as another element of randomization when there are more than two filters; this auxiliary variable, j, is randomly set (304). Finally, the counting variable i is increased by the greater of 1 or j (306). An algorithm is invoked to maintain statistics pertaining to efficiency of the filters and their processing of data chunks (308). In one embodiment, the following pseudo code is employed pertaining to obtaining the statistical data at step (308):

```
Done ← No /flag for navigation/
Reset timer
Start timer
Result ← apply (f[i], input) /Apply filter i to input data chunk and get result/
Stop timer /track time to process data chunk/
If (b=OR) then if (result=Pass) then done ← Yes /flag changed/
If (b=AND) then if (result = Fail) then done ← Yes /flag changed/
```

Following step (308), it is determined if the auxiliary variable, j, is greater than one (310). A positive response to the determination at step (310) is followed by ascertaining the probability of the success rate (312). In one embodiment, the following pseudo-code is employed pertaining to the ascertainment at step (312):

```
c[i] ← c[i] + 1 /update count of how many times filter [i] tested/
if (done = Yes)
    s[i] ← s[i] +1 /s is an array of the number of times OR passed or
    AND failed/
    j ← 1
else j ← 0
a[i] ← a[i] + timer / a accumulates time to process/
```

A negative response to the determination at step (310) is followed by a sub-routine (314) to update special counters, filters, etc. More specifically, the sub-routine of step (314) is invoked to update counters that function to address any systemic bias. In one embodiment, the following pseudo-code is employed pertaining to the sub-routine of step (314):

```
sc[i] ← sc[i] + 1 /extra counter is incremented/
if (done = Yes)
    ss[i] ← ss[i] +1 / special success array incremented/
sa[i] ← sa[i] + timer /special processing time array accumulates time to
process/
if (j=0) return /proceed to step 228 of Fig. 2/
if (done = Yes), j ← 0 /assigns limit to special processing/
else j ← 2 /processing of special counters and filters continue/
```

Following completion of the routines at steps (312) or (314), it is determine if the counting variable, i, is greater than the total number of filters in the expression, k, (316). If it is determined that the counting variable, i, is less than the number of filters, k, then the counting variable, i, is incremented (318), and the process returns to step (308) to continue maintenance of the statistical data. Conversely, if it is determined that the counting variable, i, is equal to the number of filters, k, than the statistical data accumulation procedure is completed, followed by a return to step (230).

Figure 4:
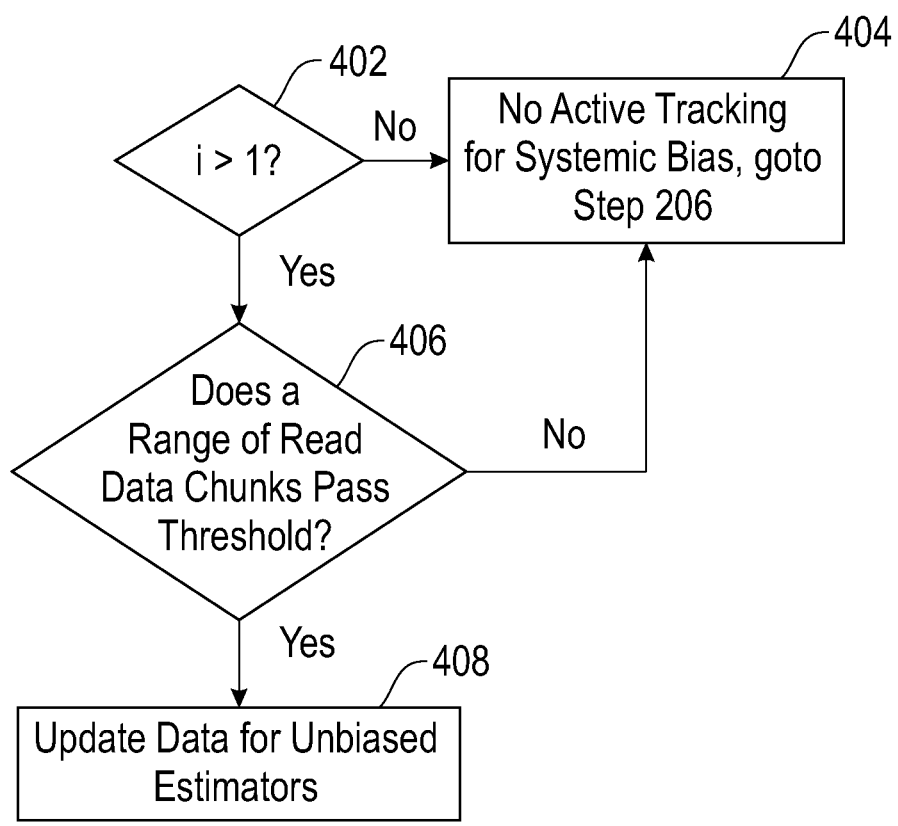
FIG. 4 is a flow chart illustrating a process for updating statistical data for the actual filters in the expression and potentially sorting the filters.

Following the conclusion of the statistical analysis identified in step (228) illustrated in FIG. 3, an update of statistical data is performed for the logical filters in the expression (228). FIG. 4 is a flow chart (400) illustrating a process for updating statistical data for the actual filters in the expression and potentially sorting the filters. Initially, it is determined if an index counter of filters that recently completed tests in FIG. 3 is greater than the integer 1 (402). If the index counter is less than the variable 2, then there is no need for changing the order of the logical operators because there is no active tracking for systemic bias (404) and the process returns to step (206). Conversely, a positive response to the determination at step (402) is followed by determining if the numbers of read data chunks that have been specially processed (as in FIG. 3) has passed a specified threshold for random application of testing (406). More specifically, the goal is to maintain special statistics at random intervals. A negative response to the determination a step (406) is an indication that there is insufficient data for correcting for systemic bias (404) followed by a return to step (206) to read and process the next data chunk from the data stream. Conversely, a positive response to the determination at step (406) is followed by a series of mathematical operations updating unbiased statistical estimators for filter performance (408). In one embodiment, the following pseudo code may be employed for the mathematical operations of step (408):

```
v ← s[i-1]/a[i-1]    /assign the variable v to the quotient of the number
                     of data chunks that passed the filter i-1 and the
                     processing time of those data chunks/
```

-continued

```
w ← s[i−1]/c[i−1]    /assign the variable w to the quotient of the number
                      of data chunks that passed filter i−1 and the
                      number of data chunks processed by filter i−1/
x ← (w*ss[i]/sc[i]) + (1−w)*s[i]/c[i]
y ← (w*sa[i]/sc[i]) + (1−w)*a[i]/c[i]
z ← x/y
    If z>v then
        s[i] ← x*c[i]
        a[i] ← y*c[i]
        Exchange (i, i−1) / exchange filters i and i−1 in the ordering/
        sc[i−1], ... ss[i] ← 0 / reset the special counters and
        accumulators
                      for filter i and filter i−1 /
```

Note that when filter i and filter i−1 are exchanged, all of their associated statistics are also exchanged. Accordingly, the process outlined in FIG. 4 updates the filter statistics based upon the special statistics, while exchanging the order of filter processing of data chunks.

As demonstrated above, one new special accumulator is added to the accumulator employed for each existing filter. This new accumulator is used on a random periodic basis to address systemic bias in order of filter processing. The new accumulator is exercised as an extra application that is performed randomly so as not to affect processing of the filters. This new accumulator comprises sc, ss, and sa and records the accumulated time, the number of chunks, and the number of successes during special processing.

Figure 5:
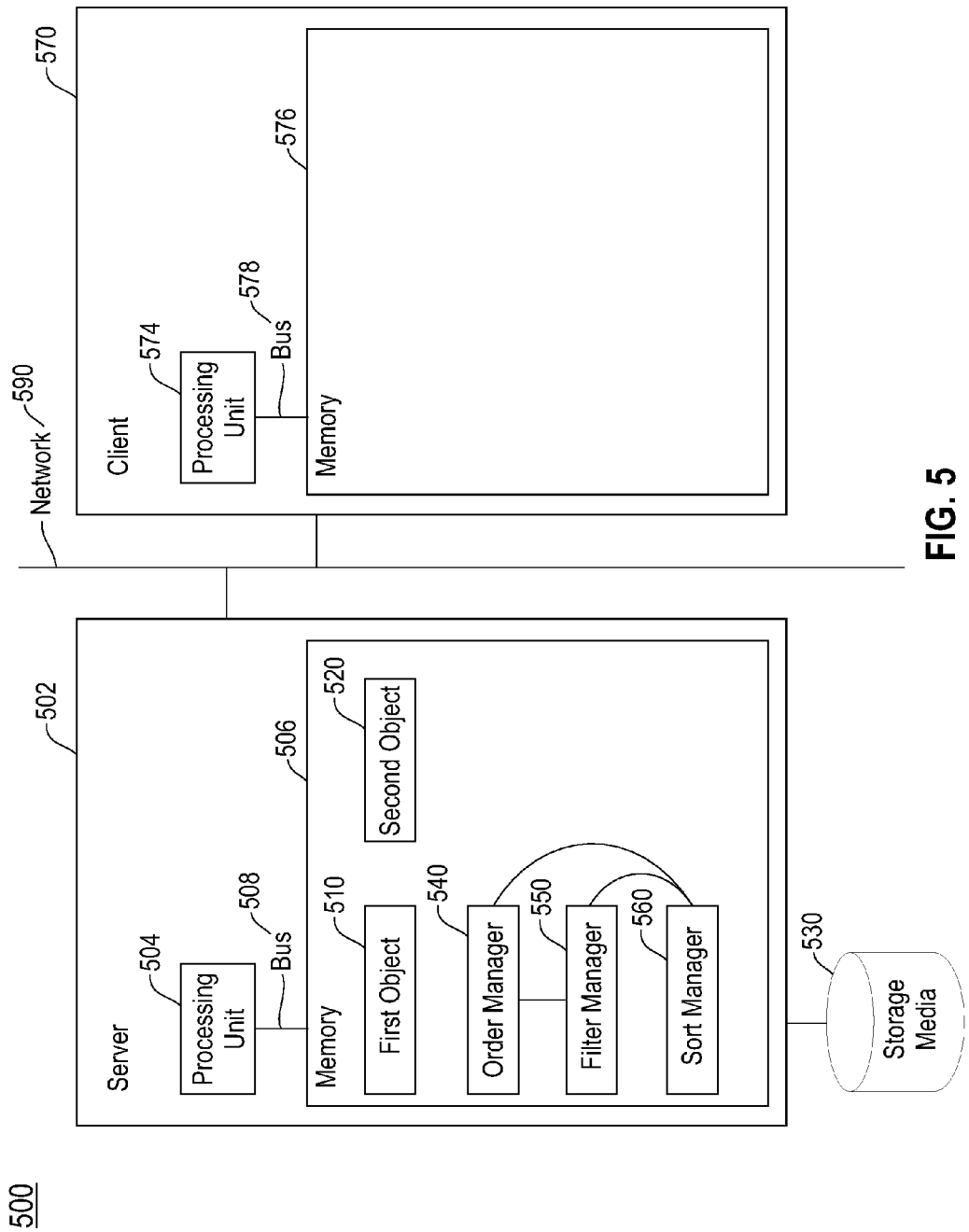
FIG. 5 is a block diagram of a computer system with tools employed to evaluate the filters and filter processing, according to the preferred embodiment of this invention, and is suggested for printing on the first page of the issued patent.

Evaluating filter performance with respect to chunks of data from a data input stream, as described in FIGS. 1-4, may employ tools embedded in a computer system. As described above, an input stream of data is processed by applying each read data chunk to two or more filters for data evaluation and processing. FIG. 5 is a block diagram (500) of a computer system for with tools employed to evaluate the filters and filter processing. As shown, a server (502) is provided in communication with storage media (530), which is employed to store data. The server (502) includes a processing unit (504) in communication with memory (506) across a bus (508). Although only one processing unit (504) is shown, the invention should not be limited to the quantity shown herein. In one embodiment, two or more processing units may be provided in the server (502). The data stream is received by the server (502), which employs one or more tools, including but not limited to managers, directors, filters, etc. to process the data stream for relevant data. More specifically, the server is provided with first and second objects (510) and (520), respectively. Each of the first and second objects (510) and (520) are associated with respective filters. The first object (510) is associated with a first filter and functions to ascertain an accumulated processing time by its associated filter to process a chunk of data from the input data stream. Similarly, the second object (520) is associated with a second filter and functions to ascertain an accumulated processing time by its associated filter to process a chunk of data from the input data stream. An order manager (540) is provided in communication with both the first and second objects, and selects an order of application of the first and second filters. More specifically, the order selection is based on the values of the first and second objects (510) and (520), respectively. A filter manager (550) is provided in communication with the order manager (540), and functions to maintain at least two sets of estimators for the first filter. Each set estimates performance of the first filter given a specified performance for the filter. In addition, a sort manager (560) is provided in communication with the order and filter managers (540) and (550), respectively, and functions to dynamically sort the selected order of application of the first and second filters. More specifically, the sort manager (560) enables a more efficient filter to precede a less efficient filter based upon data gathered and maintained by the filter manager (550). In one embodiment, the sort manager (560) employs a bubble sort algorithm to change the order of application of the filters, however, other sorting algorithms may be employed by the sort manager (560), and as such the invention should not be limited to a bubble sort algorithm. Additionally, the filter manager (550) is employed to both detect and reduce systemic bias associated with the order of application of the filters.

The server (502) is in communication with a client machine (570) across a network (590). The client machine (570) includes a processing unit (574) in communication with memory (576) across a bus (578). Although only one processing unit (574) is shown, the invention should not be limited to the quantity shown herein. In one embodiment, two or more processing units may be provided in the client machine (570). In one embodiment, the order, filter, and sort managers (540), (550), and (560), respectively, are provided local to the client machine.

As identified above, the order, filter, and sort managers (540), (550), and (560) function to evaluate an input stream of data, and more specifically, evaluate processing efficiency associated with data stream filters. The order, filter, and sort managers (540), (550), and (560) are each shown residing in memory (506) local to the server (502). Although in one embodiment, the order, filter, and sort manager (540), (550), and (560) may reside in memory (576) local to the client machine (570). In one embodiment, the managers may reside as hardware tools external to local memory, or they may be implemented as a combination of hardware and software. Similarly, in one embodiment, the manager(s) and director may be combined into a single functional item that incorporates the functionality of the separate items. As shown herein, each of the manager(s) and director are shown local to the server (502). However, in one embodiment they may be collectively or individually distributed across the network and function as a unit to process one or more input streams of data for filter evaluation. Accordingly, the manager(s) and director may be implemented as software tools, hardware tools, or a combination of software and hardware tools, to collect and organize data content.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include, but are not limited to, compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual processing of the program code, bulk storage, and cache memories which provide temporary storage of at least some program code in order to reduce the number of times code must be retrieved from bulk storage during processing.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening networks.

The software implementation can take the form of a computer program product accessible from a computer-useable or computer-readable medium providing program code for use by or in connection with a computer or any instruction processing system. In one embodiment, instructions are provided to process an input stream of data. More specifically, instructions are provided to process segments of data, identify the order of filter processing, and evaluate efficiency of the processing order. Based upon a set of estimators, the order of application of the filters is dynamically sorted to enable a more efficient filter to process the read chunk of data prior to a less efficient filter.

ALTERNATIVE EMBODIMENT

It will be appreciated that, although specific embodiments of the invention have been described herein for purposes of illustration, various modifications may be made without departing from the spirit and scope of the invention. In particular, the special accumulator for filter 1 is unnecessary and need not be initialized. Accordingly, the scope of protection of this invention is limited only by the following claims and their equivalents.

We claim:

1. A method for improving performance of a Boolean combination of at least two filters to a data stream, comprising:
    for a first filter applied to data chunks in the data stream, maintaining a first estimator to determine a performance value for the first filter;
    for a second filter applied to data chunks in the data stream, maintaining a second estimator to determine a performance value for the second filter, the second filter applied to a data chunk after the first filter;
    randomly selecting a set of times to apply the second filter to a data chunk when the first filter succeeds;
    maintaining a third estimator to estimate a performance value of the second filter at the selected set of times given the first filter succeeds;
    wherein the performance values for the first and second filters are based on a success rate to pass a data chunk and an average time to pass a data chunk; and
    processing the data stream, including dynamically sorting an order of application of the first and second filters based upon the performance values estimated by the first, second, and third estimators.

2. The method of claim 1, wherein the step of dynamically sorting an order of application of the filters employs a bubble sort algorithm.

3. The method of claim 1, wherein the step of maintaining the third estimator detects and reduces systematic bias associated with applying the first filter before the second filter.

4. The method of claim 1, further comprising maintaining the third estimator for the second filter using results of applying the third filter to a randomly chosen subset of all input data.

5. The method of claim 1, further comprising applying the chunk of data to a Boolean combination of the first and second filter.

6. A computer system comprising:
    a processor in communication with memory;
    a first estimator maintained for a first filter and applied to data chunks in the data stream, said first estimator to determine a performance value for the first filter;
    a second estimator maintained by a second filter, said second estimator to determine a performance value for the second filter the second filter applied to a data chunk after the first filter;
    a set of times randomly selected to apply the second filter to the data chunk when the first filter succeeds;
    a filter manager to maintain a third estimator to estimate performance value of the second filter at the selected set of times given the first filter succeeds;
    wherein the performance values for the first and second filters is based upon a success rate to pass a data chunk and an average time to pass the data chunk; and
    a sort manager in communication with the filter manager, the sort manager to process the data stream, including dynamically sorting an order of application of the first and second filters based upon the performance values determined by the three estimators.

7. The system of claim 6, wherein the sort manager dynamically sorts an order of application of the filters with a bubble sort algorithm.

8. The system of claim 6, wherein the filter manager detects and reduces systematic bias associated with application of the second filter after the first filter.

9. The system of claim 6, further comprising the third estimator maintained for the second filter using results of application of at least one filter to a randomly chosen subset of all input data.

10. The system of claim 6, further comprising a Boolean combination of the first and second filter applied to the chunk of data.

11. An article comprising:
    a non-transitory computer readable data storage device, including computer program instructions configured to improve performance of a Boolean combination of at least two filters to a data stream, the instructions comprising:
    instructions to select a first filter to be applied prior to a second filter;
    instructions to maintain a first estimator applied to data chunks in the data stream to determine a performance value for the first filter;
    instructions to maintain a second estimator to determine a performance value for the second filter;
    instructions to provide a set of times randomly selected to apply the second filter to the data chunk when the first filter succeeds;
    instructions to maintain a third estimator, the third estimator estimating a performance value of the second filter at the set of times given the first filter succeeds;
    wherein the performance values for the first and second filters based upon a success rate to pass a data chunk and an average time to pass a data chunk; and
    instructions to process the data stream, including dynamically sorting an order of application of the first and second filters based upon the performance values determined by the maintained three estimators.

12. The article of claim 11, wherein the dynamic sort of said selected order of application of the first and second filters employs a bubble sort algorithm.

13. The article of claim 11, wherein the instructions to maintain the third estimator for the second filter detects and reduces systematic bias associated with applying the second filter before the first filter.

14. The article of claim 11, further comprising instructions to maintain the third estimator for the second filter using results of applying at least one filter to a randomly chosen subset of all input data.

15. The article of claim 11, further comprising instructions to apply the chunk of data to a Boolean combination of the first and second filter.

16. The method of claim 1, wherein the first filter succeeds when the data chunk is passed and the first and second filters are connected by an OR logical operator.

17. The method of claim 1, wherein the first filter succeeds when the data chunk is not passed and the first and second filters are connected by an AND logical operator.

* * * * *